United States Patent
Gootherts et al.

(10) Patent No.: US 7,577,945 B2
(45) Date of Patent: Aug. 18, 2009

(54) MEMORY MAPPED LAZY SIGNAL BLOCKING

(75) Inventors: Paul Gootherts, Santa Clara, CA (US); Douglas Larson, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 854 days.

(21) Appl. No.: 11/139,814

(22) Filed: May 26, 2005

(65) Prior Publication Data

US 2006/0288333 A1 Dec. 21, 2006

(51) Int. Cl.
*G06F 9/44* (2006.01)
*G06F 9/45* (2006.01)

(52) U.S. Cl. .................. 717/141; 717/142; 717/143; 717/144; 717/131; 717/132; 717/133

(58) Field of Classification Search .................. None
See application file for complete search history.

(56) References Cited

U.S. PATENT DOCUMENTS

| 5,937,187 | A * | 8/1999 | Kosche et al. | ............... 718/104 |
| 2005/0005265 | A1 * | 1/2005 | Knowles | ..................... 717/136 |

* cited by examiner

*Primary Examiner*—Chuck O Kendall

(57) ABSTRACT

In an embodiment of the invention, a method for lazy signal blocking, includes: when a program is going to enter a critical region of code where signals will be blocked, then setting an enabled flag and marking a signal mask with signals to be blocked, wherein the enabled flag and the signal mask are in a memory address space of the program; and when the program has left the critical region of code where signals will be blocked, then clearing the enabled flag.

19 Claims, 2 Drawing Sheets

MEMORY MAPPED LAZY SIGNAL BLOCKING

TECHNICAL FIELD

Embodiments of the present invention relate generally to computer systems, and more particularly to an apparatus and method for memory mapped lazy signal blocking.

BACKGROUND

Many current operating systems provide a mechanism called "signals". This is a software feature that is similar to interrupts in the hardware environment. A program or operating system sends the signals to interrupt an application program, in order to notify the application program of an event.

Such interruptions (signals) usually take the form of a forced asynchronous procedure call that handles whatever tasks are required by the interruption. The specific function called is designated in advance by the interrupted program.

In the absence of a handler function, the interrupted program is usually aborted.

Programs may be performing delicate operations that should be completed and not interrupted by the signals until the delicate operation(s) is completed. Because the exact arrival time of each signal is usually not predictable, programs need a mechanism to hold off delivery of signals until certain delicate operations (that would be disturbed by an incoming signal) can be completed. This mechanism is known as "signal blocking" or "signal masking".

It is common for a program to enter and leave critical regions of code frequently. A critical region is a sequence of instructions that is executed by a process (thread) in a program without interference so that the process can atomically manipulate shared data. As a result, signal masking and unmasking (i.e., re-enabling of reception of the signal) are required to be fast, or overall program throughput will become limited.

In current systems, the program establishes and disables signal masks via a system call (i.e., by calling the operating system on both entry to and exit from every critical region, each and every time that the entry or exit is performed). The most common technique for speeding up this process is to supply special system calls that have been tuned for speed. However, since the operating system is still called on entry and exit of each critical region, overall program performance is still limited unnecessarily.

In some programs, signal masking and unmasking may occur, for example, about 100 to 1000 times per seconds, and this leads to inefficiency in programs because the large amount of masking and unmasking is time-consuming and a signal may not have been received when the masking and unmasking is performed. For example, the ratio of performing masking/unmasking and actually receiving a signal is typically 1,000-to-1 to 1,000,000-to-1 or more in some programs.

Therefore, there is a continuing need to improve and enhance the performance (e.g., speed) of current methods to mask and unmask the signals.

SUMMARY OF EMBODIMENTS OF THE INVENTION

In an embodiment of the invention, a method for lazy signal blocking, includes: when a program is going to enter a critical region of code where signals will be blocked, then setting an enabled flag and marking a signal mask with signals to be blocked, wherein the enabled flag and the signal mask are in a memory address space of the program; and when the program has left the critical region of code where signals will be blocked, then clearing the enabled flag. The method may also include: reading, by an operating system, the enabled flag when a signal is to be delivered by the operating system. In another embodiment of the invention, an apparatus is provided that performs the above method.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments of the invention.

Figure 1:
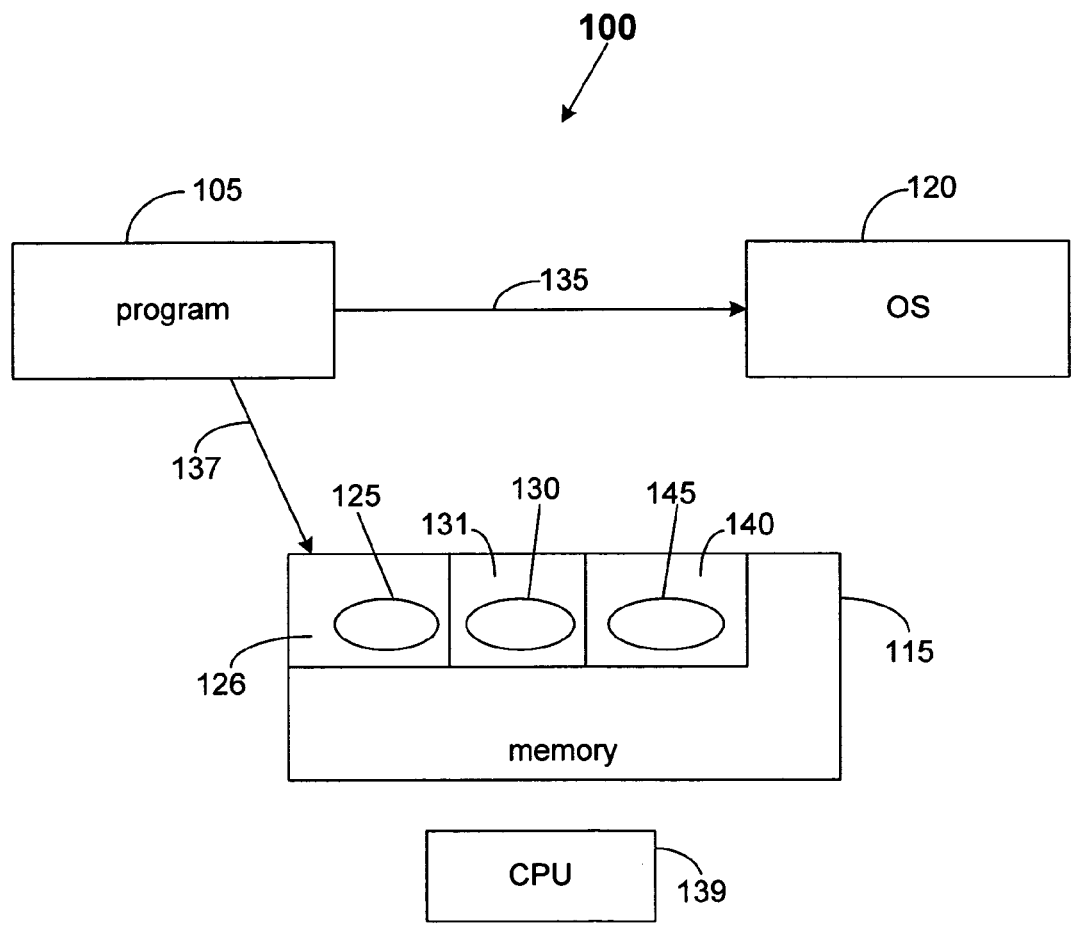
FIG. 1 is a block diagram of an apparatus (system), in accordance with an embodiment of the invention.

FIG. 1 is a block diagram of an apparatus (system) 100, in accordance with an embodiment of the invention. The system 100 is typically in an environment of a computer or computing machine. In the example of FIG. 1, a program 105 sets aside multiple memory areas (in memory 115) which is typically a small memory area. The memory area is used by the program 105 in order to communicate with the operating system 120, as described below.

A signal mask 125 is stored in a memory area 126, and an enabled flag 130 is stored in a memory area 131. Note that the invention does not require the entire signal mask 125 to be modifiable in a single, atomic machine instruction or operation. This leads to a performance advantage because, in practice, signal masks are too large for most computers to load or store in a single atomic operation.

Because the enabled flag 130 operates on the entire signal mask 125, it is not necessary for the operating system 120 to be able to read the entire signal mask 125 atomically (to maintain a consistent picture of the signal mask 125). If the program 105 always clears the enabled flag 130 before making changes to the signal mask 125 (and sets the enabled flag 130 after making changes to the signal mask 125), the operating system 120 will not see the signal mask 125 in an inconsistent state.

The enabled flag 130 is set when the signal mask 125 is in effect and cleared when the signal mask 125 is not in effect. Typically, the enabled flag 130 may be a simple Boolean that can be changed in value by a store operation. Therefore, memory mapping of the enabled flag 130 permits the blocking of signals, in accordance with an embodiment of the invention.

Initially, a thread in the program 105 clears the enabled flag 130 and then informs the operating system 120 of the memory locations of the mask 125 and the enabled flag 130. The thread can inform the operating system 120, for example, by sending a system call 135 to the operating system 120. After the operating system 120 is notified of the memory locations of the mask 125 and enabled flag 130, initial setup of the system 100 is now completed and an embodiment of the invention can perform the method described below.

When the program 105 is about to enter a critical region of code where signals need to be blocked, the program 105 will mark the signal(s) to be blocked in the signal mask 125 and will then set the enabled flag 130. As a result, signal masking is provided for particular signals.

Once the program 105 has left the critical region of code where signals need to be blocked, the program 105 will clear the enabled flag 130. As a result, signal masking is no longer provided for signals.

An advantage provided by the above method is that at no time during the program's 105 entry into or exit of the critical region is it necessary for the program 105 to make a system call to the operating system 105 to inform the operating system 105 of the masking or unmasking of signals. In contrast, previous methods require a program to make this expensive system call to the operating system 105 during entry into and during exit from a critical region, because data stored in the operating system 105 is manipulated during signal masking and unmasking.

The operating system 120 reads the enable flag 130 (and the mask 125 in some embodiments of the invention) only when the operating system 120 delivers a signal to interrupt the program 105. This feature leads to increase in performance speed. The method above shifts the burden (during signal delivery) from the setup/disable code in the program 105 (which is executed often) to the signal delivery code in the operating system 120 (which is executed far less frequently).

Embodiments of the invention provides a "lazy" signal blocking method by causing the expensive operation to be performed less frequently, and the cheap operations to be performed more frequently. Specifically, the program 105 can set and clear the enabled flag 130 and setup and tear down the signal mask 125, which are both located in the memory address space of the program 105. This frequent operation of setting and clearing the enabled flag 130 and setting and tearing down the signal mask 124 can be performed at a very fast speed because communication between the program 105 and the memory location 110 is along a very common path 137 (i.e., is a cheap operation). In contrast, the expensive operation is performed when the kernel of the operating system 120 looks into the memory location 131 to read the enabled flag 130 when the kernel is delivering a signal to interrupt the program 105. This expensive operation is performed less frequently than the cheap operation of setting/tearing the masks 125 and setting/clearing the enabled flag 130.

The above operation can be performed atomically by any modern computer, so there is no race condition between the operating system 120 and the program 105.

Note that there is implicit synchronization in the model of system 100, since the signal delivery and the various operations on the set-aside memory areas are all performed on the same processor 139. This is what permits synchronization without explicit locking.

As an optional feature in an embodiment of the invention, the program 105 can set up a third memory area 140 (in the memory address space of program 105) during initialization of the system 100. The program 105 informs the operating system 120 of this third memory area 140 location in the memory 115 via a system call 135 to the operating system. This area 140 would hold a second signal mask 145 that would be used by the operating system 120 to determine which signals, if any, are ready and waiting for delivery (pending signals). The program 105 could look at this second mask 145 by using simple memory references, rather than using an expensive system call to the operating system 120, in order to inform a user of the pending signals. A system call can be made to the operating system 120 to handle the pending signals. The operating system 120 can also update the pending signals in the second mask 145 when the operating system 120 is delivering a signal to interrupt the program 105.

Note also that the lazy signal blocking features in FIG. 1 can be implemented or function along with current signal blocking systems.

Figure 2:
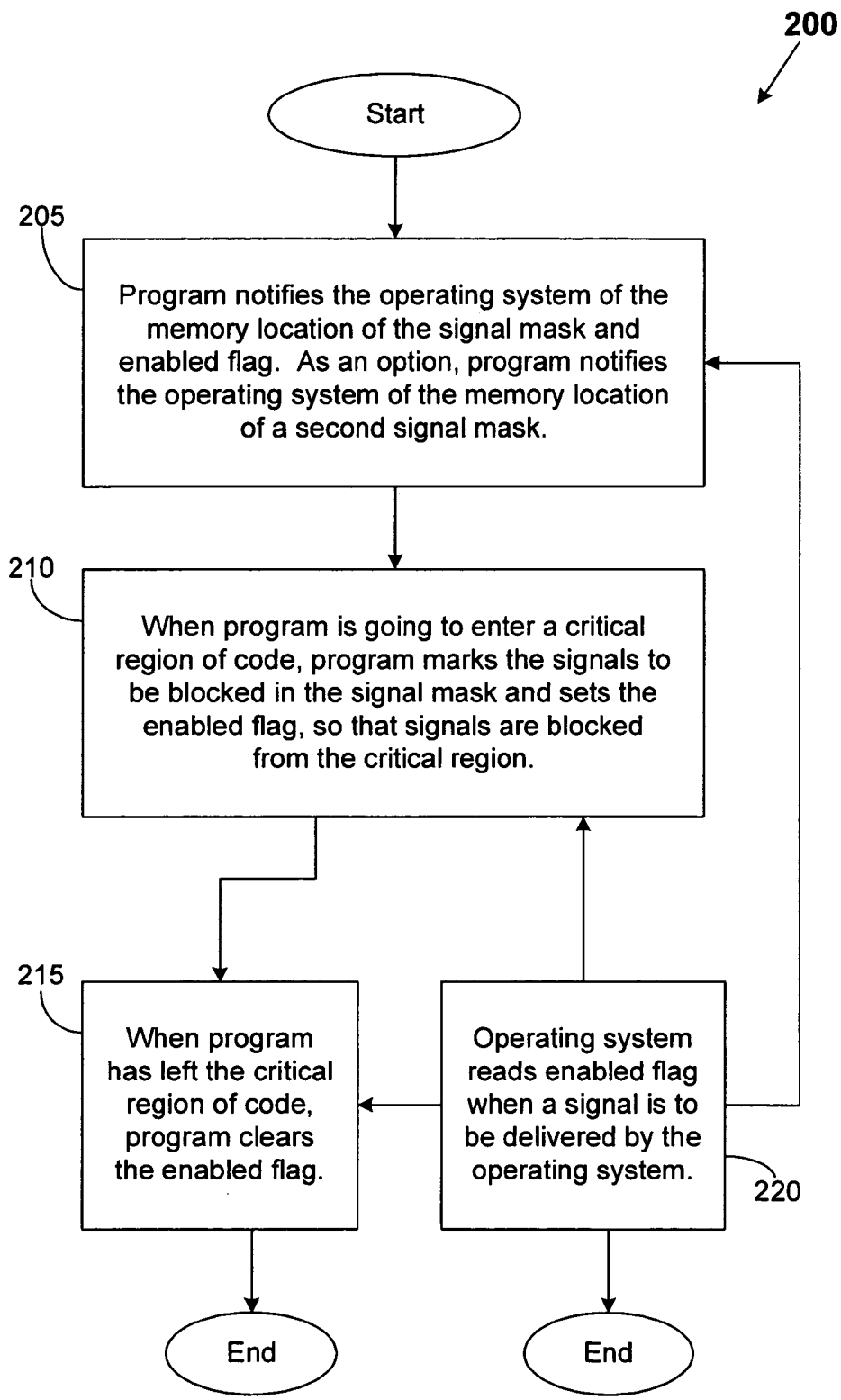
FIG. 2 is a flowchart of a method, in accordance with an embodiment of the invention.

FIG. 2 is a flowchart of a method 200, in accordance with an embodiment of the invention. In block 205, the program notifies the operating system of the memory location of the signal mask and the enabled flag. As an option, in other embodiments of the invention, the program notifies the operating system of the memory location of a second signal mask.

In block 210, when the program is going to enter a critical region of code where signals need to be blocked, the program marks the signals to be blocked in the signal mask sets the enabled flag, so that signals are blocked from the critical region.

In block 215, when the program has left (exited) the critical regions of code where signals need to be blocked, the program clears the enabled flag so that signals are no longer blocked from the critical region.

Note that in block 220, at any time after initialization of the system 100, the operating system 120 can read the enabled flag when a signal is to be delivered by the operating system. Note that block 220 can occur prior to block 210 and/or block 215, and can also occur after block 210 and/or block 215. When the operating system reads the enabled flag as set, the signal to be delivered by the operating system is blocked from the critical section of code. When the operating system reads the enabled flag as cleared, the signal to be delivered by the operating system is not blocked from the critical section of code.

The various processes or programs discussed herein may be, for example, software code, firmware, commands, data files, software programs, code, instructions, or the like, and may also include suitable mechanisms.

Reference throughout this specification to "one embodiment", "an embodiment", or "a specific embodiment" means that a particular feature, structure, or characteristic described in connection with the embodiment is included in at least one embodiment of the present invention. Thus, the appearances of the phrases "in one embodiment", "in an embodiment", or "in a specific embodiment" in various places throughout this specification are not necessarily all referring to the same embodiment. Furthermore, the particular features, structures, or characteristics may be combined in any suitable manner in one or more embodiments.

Other variations and modifications of the above-described embodiments and methods are possible in light of the foregoing disclosure. Further, at least some of the components of an embodiment of the invention may be implemented by using a programmed general purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

It is also within the scope of an embodiment of the present invention to implement a program or code that can be stored in a machine-readable medium to permit a computer to perform any of the methods described above.

Additionally, the signal arrows in the drawings/Figures are considered as exemplary and are not limiting, unless otherwise specifically noted. Furthermore, the term "or" as used in this disclosure is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

It is also noted that the various functions, variables, or other parameters shown in the drawings and discussed in the text have been given particular names for purposes of identification. However, the function names, variable names, or other parameter names are only provided as some possible examples to identify the functions, variables, or other parameters. Other function names, variable names, or parameter names may be used to identify the functions, variables, or parameters shown in the drawings and discussed in the text.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for lazy signal blocking, the method comprising:
when a program executing in a computer is going to enter a critical region of code where signals will be blocked, then the program setting an enabled flag and marking a signal mask indicating signals to be blocked, wherein the enabled flag and the signal mask are in a memory address space of the program; and
when the program executing in the computer has left the critical region of code where signals will be blocked, then clearing the enabled flag, wherein the signal mask is in effect if the enabled flag is set, and the signal mask is not in effect if the enabled flag is not set.

2. The method of claim 1, further comprising:
reading, by an operating system executing in the computer, the enabled flag when a particular signal is to be delivered by the operating system.

3. The method of claim 2, further comprising:
when the operating system reads the enabled flag as set, then blocking the particular signal to be delivered by the operating system, if the signal mask indicates that the particular signal is to be blocked.

4. The method of claim 2, further comprising:
when the operating system reads the enabled flag as cleared, then not blocking the particular signal to be delivered by the operating system.

5. The method of claim 2, further comprising:
notifying the operating system of the memory locations of the signal mask and the enabled flag.

6. The method of claim 2, further comprising:
notifying the operating system of the memory location of a second signal mask, wherein the second signal mask is to indicate which pending signals are waiting for delivery.

7. The method of claim 6, further comprising:
reading the second signal mask to determine the pending signals.

8. An apparatus for lazy signal blocking, the apparatus comprising:
a processor;
a program executable on the processor;
a memory containing a memory area for the program, the memory area including a signal mask and an enabled flag;
wherein the program is configured to set the enabled flag and mark the signal mask to identify signals to be blocked, when the program is going to enter a critical region of code where signals will be blocked; and
wherein the program is configured to clear the enabled flag when the program has left the critical region of code where signals will be blocked, wherein the signal mask is in effect if the enabled flag is set, and the signal mask is not in effect if the enabled flag is not set.

9. The apparatus of claim 8, further comprising:
an operating system executable on the processor to read the enabled flag when a particular signal is to be delivered by the operating system.

10. The apparatus of claim 9, wherein the signal mask is configured to block the particular signal to be delivered by the operating system, when the operating system reads the enabled flag as set and if the signal mask indicates the particular signal is to be blocked.

11. The apparatus of claim 9, wherein the signal mask is configured to not block the particular signal to be delivered by the operating system, when the operating system reads the enabled flag as cleared.

12. The apparatus of claim 9, wherein the program is configured to notify the operating system of the memory locations of the signal mask and the enabled flag.

13. The apparatus of claim 9, wherein the program is configured to notify the operating system of the memory location of a second signal mask, wherein the second signal mask is to indicate which pending signals are waiting for delivery.

14. The apparatus of claim 13, wherein the operating system is configured to read the second signal mask to determine the pending signals.

15. An article of manufacture, comprising:
a machine-readable storage medium having stored thereon instructions that upon execution by a computer causes the computer to:
set an enabled flag and mark a signal mask with signals to be blocked when a program is going to enter a critical region of code where signals will be blocked, wherein the enabled flag and the signal mask are in a memory address space of the program; and
clear the enabled flag, when the program has left the critical region of code where signals will be blocked, wherein the signal mask is in effect if the enabled flag is set, and the signal mask is not in effect if the enabled flag is not set.

16. An apparatus for lazy signal blocking, the apparatus comprising:

means for setting an enabled flag and for marking a signal mask with signals to be blocked when a program is going to enter a critical region of code where signals will be blocked, and for clearing the enabled flag when the program has left the critical region of code where signals will be blocked, wherein the enabled flag and the signal mask are in a memory address space of the program, wherein the signal mask is in effect if the enabled flag is set, and the signal mask is not in effect if the enabled flag is not set.

17. The method of claim 1, wherein marking the signal masks indicating signals to be blocked comprises marking the signal mask to indicate interruptions that are to be blocked.

18. The apparatus of claim 8, wherein marking the signal mask to identify signals to be blocked comprises marking the signal mask to identify interruptions that are to be blocked.

19. The article of claim 15, wherein marking the signal mask with signals to be blocked comprises marking the signal mask to identify interruptions that are to be blocked.

* * * * *